US010658640B2

(12) United States Patent
Sugata et al.

(10) Patent No.: US 10,658,640 B2
(45) Date of Patent: May 19, 2020

(54) POLYOLEFIN MICROPOROUS MEMBRANE, PRODUCTION METHOD THEREOF, SEPARATOR FOR NON-AQUEOUS ELECTROLYTE SECONDARY BATTERY, AND NON-AQUEOUS ELECTROLYTE SECONDARY BATTERY

(71) Applicant: TORAY INDUSTRIES, INC., Tokyo (JP)

(72) Inventors: Masami Sugata, Tochigi (JP); Naoki Toyota, Tochigi (JP)

(73) Assignee: TORAY INDUSTRIES, INC., Tokyo (JP)

( * ) Notice: Subject to any disclaimer, the term of this patent is extended or adjusted under 35 U.S.C. 154(b) by 424 days.

(21) Appl. No.: 15/329,868

(22) PCT Filed: Aug. 7, 2015

(86) PCT No.: PCT/JP2015/072540
§ 371 (c)(1),
(2) Date: Jan. 27, 2017

(87) PCT Pub. No.: WO2016/024548
PCT Pub. Date: Feb. 18, 2016

(65) Prior Publication Data
US 2017/0263906 A1   Sep. 14, 2017

(30) Foreign Application Priority Data

Aug. 12, 2014   (JP) .................................. 2014-164201

(51) Int. Cl.
*H01M 2/16*         (2006.01)
*C08J 9/28*         (2006.01)
(Continued)

(52) U.S. Cl.
CPC ............. *H01M 2/1653* (2013.01); *C08J 5/18* (2013.01); *C08J 9/28* (2013.01); *H01M 2/145* (2013.01);
(Continued)

(58) Field of Classification Search
CPC ... C08J 9/28; C08J 5/18; C08J 2423/06; C08J 2323/06; H01M 2/16; H01M 10/0566;
(Continued)

(56) References Cited

U.S. PATENT DOCUMENTS

2009/0042008 A1    2/2009  Kimishima et al.
2010/0069596 A1*   3/2010  Kimishima ............. B29C 48/07
                                                        526/352
2017/0092920 A1    3/2017  Matsumoto et al.

FOREIGN PATENT DOCUMENTS

JP    1994-096753 A    11/1995
JP    2000/248093 A     9/2000
(Continued)

OTHER PUBLICATIONS

International Search Report and Written Opinion of PCT/JP2015/072540 dated Oct. 11, 2015, all pages.
(Continued)

*Primary Examiner* — Jonathan G Jelsma
*Assistant Examiner* — Omar M Kekia
(74) *Attorney, Agent, or Firm* — Kilpatrick Townsend & Stockton LLP

(57) ABSTRACT

The present invention provides a microporous membrane having an excellent balance of temperature characteristics, shrinkage characteristics, permeability, and strength, and thereby realizes a separator for a non-aqueous electrolyte secondary battery and a non-aqueous electrolyte secondary battery, having excellent performance and excellent safety. A polyolefin microporous membrane having;
a temperature difference not less than 7.2° C. between a shutdown shrinkage temperature and a maximum shrinkage temperature in a TD measured by TMA;
a shrinkage rate difference less than 25% between a shutdown shrinkage rate and a maximum shrinkage rate in the TD;

(Continued)

a pin puncture strength at a membrane thickness of 16 μm being not less than 400 gf; and a ratio of pin puncture strength to air permeation resistance at a membrane thickness of 16 μm being from 2.0 to 4.0 (gf/(sec/100 cc)).

9 Claims, 2 Drawing Sheets

(51) Int. Cl.
    *H01M 10/0566*     (2010.01)
    *C08J 5/18*     (2006.01)
    *H01M 2/14*     (2006.01)

(52) U.S. Cl.
    CPC ......... *H01M 2/16* (2013.01); *H01M 10/0566* (2013.01); *C08J 2323/06* (2013.01); *C08J 2423/06* (2013.01); *H01M 2300/0017* (2013.01)

(58) Field of Classification Search
    CPC ......... H01M 2300/0017; H01M 2/145; H01M 2/1653
    USPC ........................................................ 429/249
    See application file for complete search history.

(56) References Cited

FOREIGN PATENT DOCUMENTS

| | | |
|---|---|---|
| JP | 2002/256099 A | 9/2002 |
| JP | 2003-105123 A | 4/2003 |
| JP | 2004/307712 A1 | 11/2004 |
| JP | 2005/343957 A | 12/2005 |
| JP | 2010/007053 A | 1/2010 |
| WO | 2007/060991 A1 | 5/2007 |

OTHER PUBLICATIONS

International Preliminary Report on Patentability of PCT/JP2015/072540 dated Feb. 14, 2017, all pages.

* cited by examiner

POLYOLEFIN MICROPOROUS MEMBRANE, PRODUCTION METHOD THEREOF, SEPARATOR FOR NON-AQUEOUS ELECTROLYTE SECONDARY BATTERY, AND NON-AQUEOUS ELECTROLYTE SECONDARY BATTERY

This application is a United States National Phase Application of International Patent Application Number PCT/JP2015/072540, filed Aug. 7, 2015 and entitled "POLYOLEFIN MICROPOROUS MEMBRANE AND METHOD FOR MANUFACTURING SAME, SEPARATOR FOR NONAQUEOUS-ELECTROLYTE SECONDARY CELL, AND NONAQUEOUS-ELECTROLYTE SECONDARY CELL", which Application claims priority to Japanese Patent Application Number 2014-164201, filed with the Japanese Patent Office on Aug. 12, 2014, the contents of which are incorporated herein by reference in their entirety.

TECHNICAL FIELD

The present invention relates to a polyolefin microporous membrane and a separator for a non-aqueous electrolyte secondary battery produced using the same. More particularly, the present invention relates to a polyolefin microporous membrane having excellent safety and a separator for a non-aqueous electrolyte secondary battery produced using the same.

BACKGROUND ART

In order to prevent internal shorting in a battery using a non-aqueous electrolytic solution such as a lithium ion battery, a separator having a shutdown function for shutting down a reaction upon temperature thereof exceeding a prescribed temperature is essential. A battery separator typically consists of a microporous membrane. If the temperature increases, the separator shrinks and the fine pores are blocked at around the melting point, which leads to the shutdown of the battery reaction. When an increase in temperature continues further, the microporous membrane switches from shrinking to expanding at a certain temperature, ultimately resulting in membrane puncture (meltdown).

The shutdown temperature can be expressed as the temperature (shutdown starting temperature) at the inflection point of a sample length observed around the melting point in TMA measurement. If the microporous membrane does not have such an inflection point, shutdown and shrinkage progress simultaneously as the temperature increases, which makes it difficult to sufficiently suppress reactions at the time of an abnormality. Therefore, from the perspective of safety, a microporous membrane for a separator preferably has such an inflection point. On the other hand, if the time between the beginning of shutdown and completion of blocking of the pores is short, there is a risk that the energy may be discharged all at once in the event of a meltdown. Therefore, in order to gradually reduce the energy discharged at the time of an abnormality, the shutdown temperature is preferably sufficiently lower than the maximum shrinkage temperature or the meltdown temperature.

In the production of a separator, the strength of the separator is often enhanced by imparting the separator with orientation by means of stretching or the like. A separator having such orientation may exhibit anisotropy with regard to not only strength, but also temperature characteristics such as the shutdown temperature. Here, because separators are ordinarily wound in a state under tension applied in the MD (machine direction), if the difference between the shutdown temperature and the maximum shrinkage temperature in the TD (direction perpendicular to the machine direction; transverse direction), there is a risk that the membrane may shrink rapidly in the TD due to preheating, which may cause shorting at the terminals of the battery. In addition, if the shrinkage rate at the maximum shrinkage temperature (maximum shrinkage rate) is greater than the shrinkage rate at the shutdown temperature (shutdown shrinkage rate), there is also a risk that the membrane may shrink rapidly during shutdown. Therefore, from the perspective of safety, the shutdown temperature in the TD is preferably sufficiently lower than the maximum shrinkage temperature in the TD, and the difference between the shutdown shrinkage rate and the maximum shrinkage rate in the TD is preferably small.

As one method of controlling anisotropy, it is described in Patent Document 1, for example, that the anisotropy of a microporous membrane is controlled by simultaneous biaxial stretching at different ratios. However, although the microporous membrane obtained by this method yields a relatively large difference between the shutdown temperature and the maximum shrinkage temperature, the maximum shrinkage rate tends to be large, and there is a risk that the membrane may shrink rapidly at high temperatures. In addition, with such a stretching method, it is difficult to substantially enhance the strength of the microporous membrane.

In contrast, another method is to enhance the characteristics of a microporous membrane by controlling the components of the microporous membrane. For example, a method of producing a microporous membrane using a mixture of a polyethylene, which has a low melting point and can reduce the shutdown temperature, and a polypropylene, which is advantageous for maintaining the membrane state at high temperatures, is described in Patent Document 2. However, a method of blending a polyethylene and a polypropylene tends to yield a sea-island structure due to the incompatibility of the polyethylene and the polypropylene, and non-uniformity in physical properties may manifest, which makes it difficult to achieve sufficient shutdown characteristics.

In addition, although the permeability of a separator is preferably high from the perspective of battery performance, if enhancing the permeability entails a dramatic reduction in strength, there is a risk that the separator may be easily punctured and that the safety may be diminished. Therefore, a separator for a secondary battery preferably demonstrates both high battery output due to high permeability and a high level of safety due to high strength.

CITATION LIST

Patent Literature

Patent Document 1: Japanese Unexamined Patent Application Publication No. 2010-007053A
Patent Document 2: Japanese Unexamined Patent Application Publication No. H6-096753A

SUMMARY OF INVENTION

Technical Problem

Accordingly, an object of the present invention is to provide a microporous membrane having an excellent balance of temperature characteristics, shrinkage characteristics, permeability, and strength, and to thereby realize a separator for a non-aqueous electrolyte secondary battery and a non-aqueous electrolyte secondary battery, having excellent performance and excellent safety.

Solution to Problem

In order to solve the problems described above, the present invention has one of the following constitutions.

(1) A polyolefin microporous membrane having; a temperature difference not less than 7.2° C. between a shutdown shrinkage temperature and a maximum shrinkage temperature in a TD measured by TMA; a rate difference less than 25% between a shutdown shrinkage rate and a maximum shrinkage rate in the TD; a pin puncture strength at a membrane thickness of 16 µm being not less than 400 gf; and a ratio of pin puncture strength to air permeation resistance at a membrane thickness of 16 µm being from 2.0 to 4.0 (gf/(sec/100 cc)).

(2) The polyolefin microporous membrane according to (1), wherein a porosity is not less than 45%.

(3) The polyolefin microporous membrane according to (1) or (2), wherein a content of a polyolefin having a molecular weight of not greater than $5.0 \times 10^5$ is not greater than 63 wt. %, and a content of a polyolefin having a molecular weight of not less than $1.0 \times 10^6$ is not less than 21 wt. %.

(4) The polyolefin microporous membrane according to any one of (1) to (3), wherein a content of an ultrahigh molecular weight polyolefin having a weight average molecular weight of not less than $1.0 \times 10^6$ is from 15 to 45 wt. %.

(5) A production method for the polyolefin microporous membrane described in any one of (1) to (4), the method including the steps of:

(a) preparing a polyolefin solution by melt-kneading a polyolefin resin containing an ultrahigh molecular weight polyolefin having a weight average molecular weight of not less than $1.0 \times 10^6$ and a plasticizer;

(b) forming a gel-like sheet by extruding the polyolefin solution obtained in step (a) from an extruder to form an extrudate and then cooling the extrudate;

(c) stretching the sheet obtained in step (b) in a longitudinal direction (machine direction);

(d) stretching the sheet obtained in step (c) in a transverse direction (direction perpendicular to the machine direction) consecutively after step (c);

(e) extracting the plasticizer from the stretched membrane obtained in step (d); and (f) drying the membrane obtained in step (e).

(6) A separator for a non-aqueous electrolyte secondary battery produced using the polyolefin microporous membrane described in any one of (1) to (4).

(7) A non-aqueous electrolyte secondary battery including the separator for a non-aqueous electrolyte secondary battery described in (6).

Advantageous Effects of Invention

With such a polyolefin microporous membrane of the present invention, because the difference between the shutdown shrinkage temperature and the maximum shrinkage temperature in the TD is large, and the difference between the shutdown shrinkage rate and the maximum shrinkage rate in the TD is small, energy can be discharged gradually by shrinking slowly even at high temperatures. In addition, because this microporous membrane has a high pin puncture strength, and the ratio of the pin puncture strength to the air permeation resistance is within a prescribed range, the microporous membrane also has an excellent balance of strength and permeability. Therefore, using such a microporous membrane makes it possible to obtain a separator for a non-aqueous electrolyte secondary battery having excellent shutdown characteristics and superior safety.

In addition, appropriately adjusting the molecular weight distribution of the polyolefin enables the control of anisotropy, which makes it possible to enhance the shutdown characteristics of the microporous membrane. In particular, using an appropriate amount of an ultrahigh molecular weight polyolefin makes it possible to achieve both high strength and excellent shutdown characteristics.

Further, with conventional production methods for microporous membranes, the enhancement of strength often has a trade-off relationship with the enhancement of shutdown characteristics. In contrast, in the present invention, a microporous membrane having high strength and excellent temperature characteristics in the TD can be obtained by performing sequential stretching with a prescribed method.

As described above, with the present invention, it is possible to obtain a separator for a non-aqueous electrolyte secondary battery having excellent strength, permeability, and safety. As a result, it becomes possible to realize a battery with higher performance and better safety than conventional batteries.

DESCRIPTION OF EMBODIMENTS

Preferred embodiments of the present invention will be described hereinafter.

Figure 1:
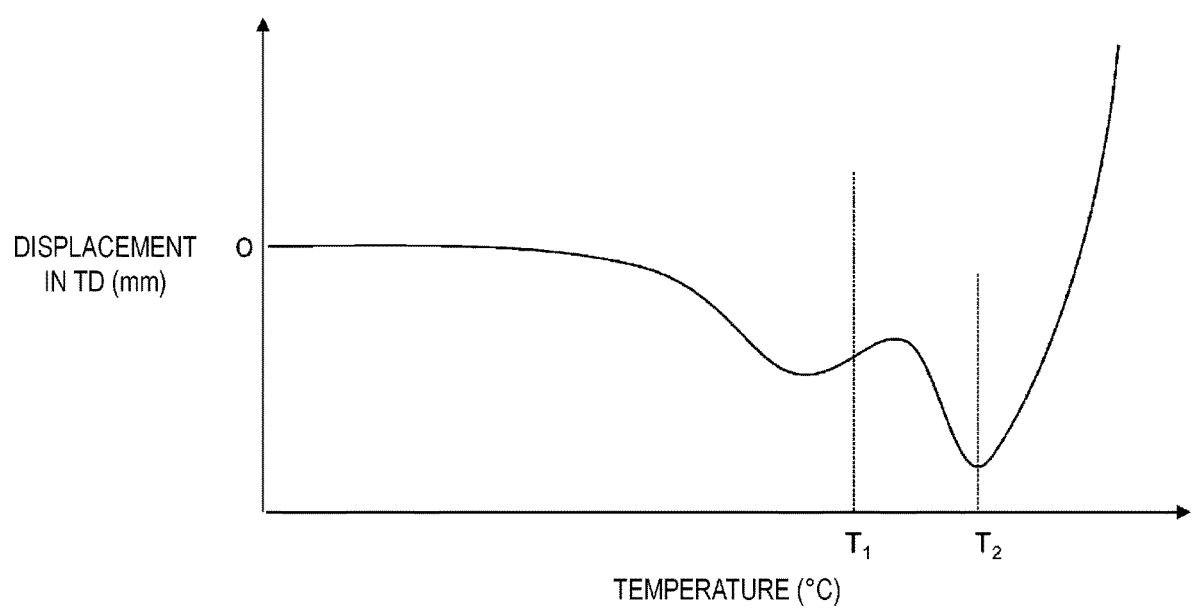
FIG. 1 is a schematic diagram for illustrating a typical result of a measurement by TMA (thermomechanical analyzer).

One characteristic of the polyolefin microporous membrane of the present invention is that the difference between the shutdown shrinkage temperature and the maximum shrinkage temperature in the TD measured by TMA (thermomechanical analyzer) is not less than 7.2° C. and preferably not less than 8.6° C. FIG. 1 is a schematic diagram of the results of a measurement with TMA. The shutdown shrinkage temperature in the TD refers to a temperature at which the shrinkage rate in the TD (first derivative of the length in the TD with respect to temperature) has a maximum value around the melting point when temperature-induced changes in the length of a sample in the TD are measured using TMA. In other words, this indicates the temperature at the inflection point of the length in the TD, which refers to $T_1$ in FIG. 1. In addition, the maximum shrinkage temperature in the TD indicates the temperature at which the length of a sample is smallest in the TD, which refers to $T_2$ in FIG. 1. If this temperature difference is small (that is, when the value of $T_2 - T_1$ is small), the membrane rapidly shrinks in the TD due to preheating, even when the current is blocked at the time of shutdown. Therefore, there is a risk that shorting may occur between electrodes at the terminals of the battery at high temperatures. The large difference between the shutdown shrinkage temperature and the maximum shrinkage temperature in the TD can increase a time duration from shutdown to the membrane begins to shrink in the TD. Thus, shrinking becomes unlikely to occur even if heat is applied at the time of an abnormality, and a microporous membrane having excellent safety can be obtained. In addition, the large difference between the shutdown shrinkage temperature and the maximum shrinkage temperature in the TD slows down the change in dimension in the width direction, even if the microporous membrane shrinks. Thus, energy can be released gradually from the ends of the microporous membrane, which makes it possible to achieve excellent safety. Note that the maximum value of the temperature difference (difference between the shutdown shrinkage temperature and the maximum shrinkage temperature in the TD) that can be realized industrially is approximately 15° C., but from the perspective of safety, the temperature difference is preferably as large as possible, and the upper limit of the temperature difference is not particularly limited. Therefore, the difference between the shutdown shrinkage temperature and the maximum shrinkage temperature in the TD is preferably from 7.2° C. to 15° C. and even more preferably from 8.6° C. to 15° C.

In the polyolefin microporous membrane of the present invention, the difference between the shutdown shrinkage rate and the maximum shrinkage rate in the TD is less than 25%. Here, the shutdown shrinkage rate in the TD is the shrinkage rate in the TD of the microporous membrane at the shutdown shrinkage temperature in the TD described above and is calculated using the length in the TD at room temperature as a reference. In addition, the maximum shrinkage rate in the TD is the shrinkage rate in the TD of the microporous membrane at the maximum shrinkage temperature in the TD described above and is calculated using the length in the TD at room temperature as a reference. Reduction in the difference between the shutdown shrinkage rate and the maximum shrinkage rate reduces the amount of shrinkage of the film after shutdown. Thus shorting is unlikely to occur, which results in excellent safety. In addition, taking safety into consideration, a shutdown function is essential, but because the pores are blocked in the event of shutdown, the shrinkage of the microporous membrane necessarily occurs. Therefore, although it is necessary to assume that the film will shrink at the time of shutdown from the perspective of battery design, if the maximum shrinkage rate is too large with respect to the shutdown shrinkage rate, it is necessary to design the size of the separator while taking this amount into account. This is not preferable from the perspective of cost. Note that the minimum value of the shrinkage rate difference (difference between the shutdown shrinkage rate and the maximum shrinkage rate) that can be realized industrially is approximately 10%, but from the perspective of safety, the shrinkage rate difference is preferably as small as possible, and the lower limit of the shrinkage rate difference is not particularly limited. Therefore, a preferable range of the difference between the shutdown shrinkage rate and the maximum shrinkage rate is from 10% to 25%.

From the perspective of enhancing durability, the microporous membrane described above preferably has a pin puncture strength of not less than 400 gf at a membrane thickness of 16 μm. Here, the pin puncture strength at a membrane thickness of 16 μm refers to the pin puncture strength $L_2$ calculated by the formula $L_2=(L_1 \times 16)/T_1$, where $L_1$ is the pin puncture strength (maximum load) of the microporous membrane at a membrane thickness $T_1$ (μm). Note that in this specification, unless stated specifically with regard to the membrane thickness, the phrase "pin puncture strength" is used to mean the "pin puncture strength at a membrane thickness of 16 μm". The maximum value of the pin puncture strength that can be realized industrially is approximately 800 gf, but from the perspective of durability, the pin puncture strength is preferably as high as possible, and the upper limit of the pin puncture strength is not particularly limited. Therefore, a preferable range of the pin puncture strength is from 400 gf to 800 gf.

From the perspective of safety, the air permeation resistance at a membrane thickness of 16 μm is preferably not less than 100 sec/100 cc. Here, the air permeation resistance at a membrane thickness of 16 μm refers to the air permeation resistance $P_2$ calculated by the formula $P_2=(P_1 \times 16)/T_1$, where $P_1$ is the air permeation resistance measured in accordance with JIS P 8117 (2009) for a microporous membrane having a membrane thickness $T_1$ (μm). Note that in this specification, unless stated specifically with regard to the membrane thickness, the phrase "air permeation resistance" is used to mean the "air permeation resistance at a membrane thickness of 16 μm". When the air permeation resistance is less than 100 sec/100 cc, there is a risk that the shutdown prior to meltdown will not be executed sufficiently in the event of an increase in the internal temperature of the battery. Note that from the perspective of a balance of battery output and safety, the upper limit of the air permeation resistance is preferably not greater than 400 sec/100 cc. Therefore, a preferable range of the air permeation resistance is from 100 sec/100 cc to 400 sec/100 cc.

From the perspective of a balance of battery output and safety, the ratio of the pin puncture strength to air permeation resistance at a membrane thickness of 16 μm, which is (pin puncture strength at a membrane thickness of 16 μm)/(air permeation resistance at a membrane thickness of 16 μm), is preferably within the range of from 2.0 to 4.0 (gf/(sec/100 cc)). Setting the ratio of the air permeation resistance and the pin puncture strength to within the range described above can achieve both high battery output due to high permeability and excellent safety due to high strength.

From the perspective of permeability performance and electrolytic solution content, the porosity is preferably not less than 35%. Setting the lower limit of the porosity to within the range described above can enhance the battery output, and this is also preferable from the perspective of accommodating future increases in battery capacity. From the perspective of ensuring strength, the upper limit of the porosity is preferably not greater than 60%. Therefore, the porosity is preferably from 35% to 60%.

In the material of the microporous membrane, the content of polyolefin components having a molecular weight of not greater than 500000 is preferably not greater than 63 wt. % when the entire polyolefin content is defined as 100 wt. %. If the content of polyolefin components having a molecular weight of not greater than 500000 is greater than 63 wt. %, a decrease occurs not only in the shutdown shrinkage temperature, but also in the maximum shrinkage temperature, and it becomes difficult to secure the strength of the microporous membrane. Note that the lower limit of the content of polyolefin components having a molecular weight of not greater than 500000 is preferably not less than 45 wt. % when the entire polyolefin content is defined as 100 wt. %. Therefore, the content of polyolefin components having a molecular weight of not greater than 500000 with respect to the weight of the entire polyolefin content is preferably from 45% to 63%.

In addition, the content of polyolefin components having a molecular weight of not less than 1000000 is preferably not less than 21 wt. % when the entire polyolefin content is defined as 100 wt. %. By setting the content of polyolefin components having a molecular weight of not less than 1000000 to not less than 21 wt. %, it is possible to achieve excellent strength and to prevent decreases in the maximum shrinkage temperature caused by the addition of low-molecular-weight polyolefins. Thus, a high level of both strength and safety can be achieved. Note that the upper limit of the content of polyolefin components having a molecular weight of not less than 1000000 is preferably not greater than 40 wt. % when the entire polyolefin content is defined as 100 wt. %. Therefore, the content of polyolefin components having a molecular weight of not less than 1000000 with respect to the weight of the entire polyolefin content is preferably from 21% to 40%.

Figure 2:
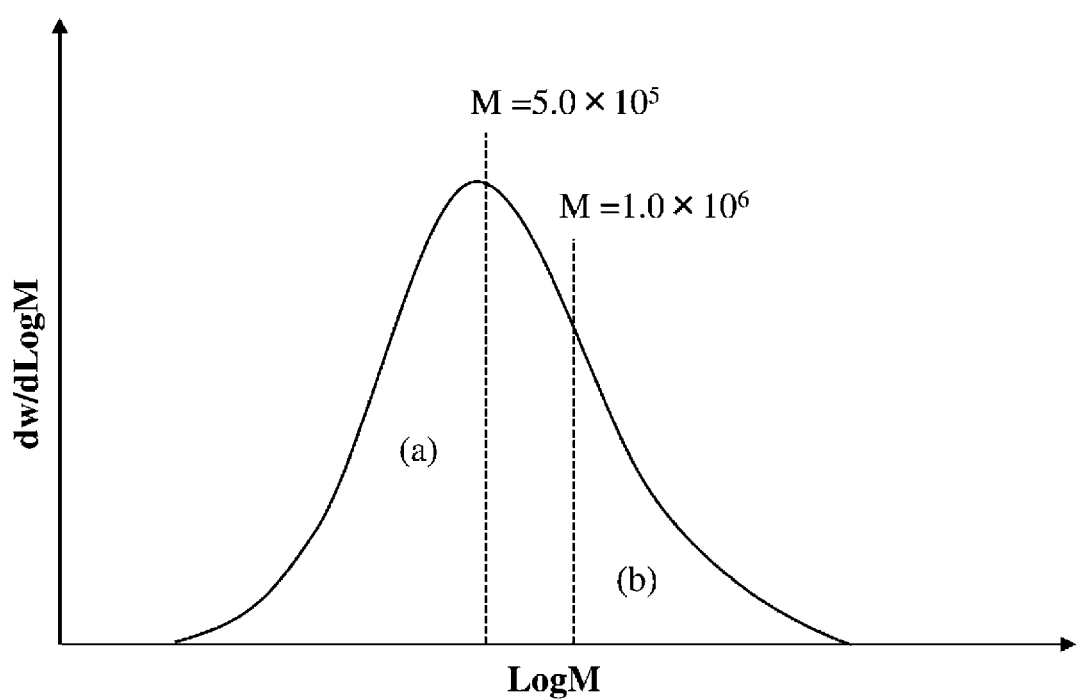
FIG. 2 is a schematic diagram illustrating an example of the molecular weight distribution curve of a polyolefin.

The molecular weight of a polyolefin can be measured by GPC (gel permeation chromatography) analysis technique. FIG. 2 is a schematic diagram of the molecular weight distribution curve of polyolefins obtained by GPC. The horizontal axis is a logarithmic value of the molecular weight, and the vertical axis is a value obtained by differentiating the concentration ratio of polyolefins with respect to the logarithmic value of the molecular weight. In FIG. 2, the region of (a) (region enclosed by the molecular weight distribution curve, the dashed line extending toward the horizontal axis from beneath the text "$M=5.0\times10^5$", and the horizontal axis) corresponds to "polyolefin components having a molecular weight of not greater than 500000", and the region of (b) (region enclosed by the molecular weight distribution curve, the dashed line extending toward the horizontal axis from beneath the text "$M=1.0\times10^6$", and the horizontal axis) corresponds to "polyolefin components having a molecular weight of not less than 1000000".

When producing a polyolefin microporous membrane, it is typical to use a plurality of polyolefins of different polymerization components or weight average molecular weights, and the characteristics of the microporous membrane can be enhanced by adjusting the added amount of each polyolefin. Therefore, in the present invention, the added amount of an ultrahigh molecular weight polyolefin having a weight average molecular weight of not less than $1.0\times10^6$ is preferably from 15 to 45 wt. % when the entire polyolefin content is defined as 100 wt. %. If the added amount of the ultrahigh molecular weight polyolefin is not less than 15 wt. %, it is possible to achieve excellent strength and to prevent decreases in the meltdown temperature or the maximum shrinkage temperature caused by the addition of low-molecular-weight polyolefins. Thus, it is possible to achieve a high level of both strength and safety. In addition, if the added amount of the ultrahigh molecular weight polyolefin is not greater than 45 wt. %, it is possible to prevent decreases in fluidity at the time of extrusion forming or decreases in drawing property at the time of production.

When an ultrahigh molecular weight polyolefin having a weight average molecular weight of not less than $1.0\times10^6$ is used as described above, the molecular weight distribution of the ultrahigh molecular weight polyolefin (ratio of the weight average molecular weight Mw to the number average molecular weight Mn; that is, Mw/Mn) is preferably within the range of from 3 to 20. If the molecular weight distribution is too narrow, the amount of high-molecular-weight components becomes large, and the fluidity at the time of extrusion forming is diminished. In addition, there is also a risk that a decrease in drawing property at the time of production may lead to membrane puncture. On the other hand, if the molecular weight distribution is too broad, there is a risk that the proportion of low-molecular-weight components will become too large to ensure strength.

The types of polyolefins serving as the materials of the microporous membrane are not particularly limited as long as the target microporous membrane can be obtained, but polyethylenes are preferably used.

The production method for the polyolefin microporous membrane described above preferably comprises the following steps of (a) to (f):

(a) preparing a polyolefin solution by melt-kneading a polyolefin resin containing an ultrahigh molecular weight polyolefin having a weight average molecular weight of not less than $1.0\times10^6$ and a plasticizer;

(b) forming a gel-like sheet by extruding the polyolefin solution obtained in step (a) from an extruder to form an extrudate and then cooling the extrudate;

(c) stretching the sheet obtained in step (b) in a longitudinal direction (machine direction);

(d) stretching the sheet obtained in step (c) in a transverse direction (direction perpendicular to the machine direction) consecutively after step (c);

(e) extracting the plasticizer from the stretched membrane obtained in step (d); and (f) drying the membrane obtained in step (e).

By executing the above steps of (a) to (f) during the production of a microporous membrane, it is possible to obtain a microporous membrane suitable for use as a non-aqueous electrolyte rechargeable battery separator. First, a microporous membrane having excellent strength and a high maximum shrinkage temperature can be obtained by using an ultrahigh molecular weight polyolefin. If there is no ultrahigh molecular weight component, the effect of maintaining shape up to high temperatures imparted by the ultrahigh molecular weight component is not achieved. In addition, because the network of molecular chains made of ultrahigh molecular weight components is not formed uniformly, nonuniform deformation tends to occur at the time of sequential stretching, in particular. In such a case, a high MD stretching ratio becomes necessary to stretch the membrane uniformly. As a result, the orientation in the TD is likely to be poor, and the maximum shrinkage temperature in the TD tends to decrease. However, if the amount of ultrahigh molecular weight components is too large, there is also a risk that membrane production will become unstable due to a decrease in fluidity or drawing property. Therefore, the added amount of ultrahigh molecular weight components is preferably within the range described above.

In addition, a microporous membrane having both excellent permeability and strength can be realized by performing sequential stretching. Possible stretching methods other than sequential stretching include simultaneous biaxial stretching, for example, but in the present invention, the excellent effects described below are achieved by using sequential stretching, wherein stretching in the machine direction in step (c) described above (also simply called "MD stretching" hereafter) and stretching in the transverse direction in step (d) described above (also simply called "TD stretching" hereafter) are performed consecutively. First, by increasing the TD stretching ratio, it is possible to increase the orientation in the TD and to increase the shrinkage temperature at high temperatures. In addition, because the stretching temperature in the MD and the stretching temperature in the TD can be varied in sequential stretching, appropriately adjusting the temperature makes it possible to achieve both the enhancement of strength due to MD stretching and the enhancement of shutdown characteristics (that is, an increase in the difference between the shutdown shrinkage temperature and the maximum shrinkage temperature) due to TD stretching. Further, by using a sequential stretching method, it is possible to tensilize the membrane more effectively than with simultaneous biaxial stretching. Thus, it is possible to achieve even higher strength. Here, "consecutive" means that step (d) is performed following step (c), so other steps (for example, a heat treatment step, a cooling step, and the like) are not implemented between steps (c) and (d). Accordingly, in the present invention, the stretching of the microporous membrane in steps (c) and (d) is performed consecutively by positioning a longitudinal stretching machine for stretching the gel-like sheet in the longitudinal direction and a transverse stretching machine for stretching the gel-like sheet in the transverse direction adjacent to one another in the production direction of the microporous membrane (direction from the extruder side to the winding side of the microporous membrane) and then using the longitudinal stretching machine and the transverse stretching machine.

A preferred embodiment of the production method described above will be described in detail hereinafter.

Step (a) Preparation of Polyolefin Solution

In step (a) described above, a polyolefin solution is prepared by dissolving a polyolefin resin in a plasticizer while heating. The plasticizer is not particularly limited as long as the plasticizer is a solvent capable of sufficiently dissolving the polyethylene. In order to enable stretching at a relatively high magnification, the solvent is preferably a liquid at room temperature. Examples of liquid solvents include: aliphatic, cycloaliphatic, or aromatic hydrocarbons such as nonane, decane, decalin, paraxylene, undecane, dodecane, and liquid paraffin; mineral oil distillates having boiling points corresponding to those of the aforementioned hydrocarbons; and phthalic acid esters which are liquids at room temperature such as dibutylphthlate and dioctylphthalate. In order to obtain a stable gel-like sheet having minimal variation in liquid solvent content, it is preferable to use a non-volatile liquid solvent such as liquid paraffin. In addition, a solvent which mixes with the polyolefin in the melt-kneaded state but is a solid at room temperature may be mixed into the liquid solvent. Examples of such a solid solvent include stearyl alcohol, ceryl alcohol, and paraffin wax. However, when a solid solvent is used alone, there is a risk that stretching unevenness or the like may occur, so the solid solvent is preferably used in combination with a liquid solvent.

From the viewpoint of better formability of the extrudate, the compounding ratio of the polyolefin resin and the plasticizer is preferably that the content of the polyolefin resin is from 10 to 50 wt. %, more preferably from 20 to 40%, and even more preferably from 20 to 35%, when the total amount of the polyolefin resin and the plasticizer is defined as 100 wt. %. The lower limit of the content of the polyolefin resin is more preferably 20 wt. %. The upper limit of the content of the polyolefin resin is more preferably 40 wt. % and even more preferably 35 wt. %. If the content of the polyolefin resin is not less than 10 wt. %, the swelling or neck-in formation is small at the outlet of the die upon forming the composition into a sheet shape. Thus, the formability and membrane forming characteristics of the sheet become favorable. In addition, if the content of the polyolefin resin is not greater than 50 wt. %, because the contraction in the thickness direction is small, the forming processability and membrane forming characteristics become favorable. If the content is within this range, it becomes easy to achieve both pin puncture strength and air permeation resistance with the membrane production method described below, and the coefficient of friction of the front and back of the membrane can also be controlled.

The viscosity of the liquid solvent is preferably from 20 to 200 cSt at 40° C. If the viscosity at 40° C. is not less than 20 cSt, the sheet formed by extruding the polyolefin solution from a die is not likely to become non-uniform. On the other hand, if the viscosity is not greater than 200 cSt, it becomes easy to remove the liquid solvent.

Step (b-1) Formation of Extrudate

The method and device for melt-kneading the polyolefin solution are not particularly limited as long as the polyolefin solution can be melt-kneaded uniformly, but melt kneading is preferably performed in an extruder—a twin-screw extruder, in particular—when preparing a high-concentration polyolefin solution. Various additives such as an antioxidant may also be added within a range that does not diminish the effect of the present invention. An antioxidant is preferably added in order to prevent the oxidation of the polyethylene, in particular.

In the extruder, the polyolefin solution is mixed uniformly at a temperature at which the polyolefin resin melts completely. The melt-kneading temperature differs depending on the polyolefin resin that is used. The lower limit thereof is preferably (the melting point of the polyolefin resin+10° C.), more preferably (the melting point of the polyolefin resin+20° C.), and most preferably (the melting point of the polyolefin resin+40° C.). The upper limit of the melt-kneading temperature is preferably (the melting point of the polyolefin resin+120° C.), more preferably (the melting point of the polyolefin resin+100° C.), and most preferably (the melting point of the polyolefin resin+70° C.). Therefore, the melt-kneading temperature in the extruder is preferably from (the melting point of the polyolefin resin+10° C.) to (the melting point of the polyolefin resin+120° C.), more preferably from (the melting point of the polyolefin resin+20° C.) to (the melting point of the polyolefin resin+100° C.), and most preferably from (the melting point of the polyolefin resin+40° C.) to (the melting point of the polyolefin resin+70° C.). Here, the melting point refers to a value measured by DSC (differential scanning calorimetry) according to JIS K7121 (1987) (the same applies hereinafter). For example, the melting point of a polyethylene composition is ordinarily from approximately 130 to 140° C., but if the melting point of the polyethylene composition used is 130° C., the lower limit of the melt-kneading temperature is preferably 140° C., more preferably 150° C., and most preferably 170° C. The upper limit is preferably 250° C., more preferably 230° C., and most preferably 200° C. Therefore, the melt-kneading temperature when a polyethylene composition having a melting point of 130° C. is used is preferably from 140° C. to 250° C., more preferably from 150° C. to 230° C., and most preferably from 170° C. to 200° C.

In addition, the melt-kneading temperature is preferably from 190 to 270° C., if the polyolefin solution contains a polypropylene.

From the perspective of preventing resin degradation, the melt-kneading temperature is preferably low. However, if the melt-kneading temperature is lower than the temperatures described above, the extrudate from the die may contain unmelted components, which may cause membrane puncture and the like in the subsequent stretching step. If the melt-kneading temperature is higher than the temperatures described above, the heat decomposition of polyolefin may become excessive, and physical properties such as pin puncture strength and tensile strength in the fine porous membrane obtained may be inferior, for example.

The ratio (L/D) of the length (L) to the diameter (D) of a screw of a twin-screw extruder is preferably from 20 to 100 from the perspective of better kneading processability and better resin dispersion and distributivity. The lower limit is preferably 35. The upper limit is preferably 70. When L/D is not less than 20, melt-kneading is sufficient. When L/D is not greater than 100, the retention time of the polyolefin solution can be prevented from increasing excessively. An inner diameter of a cylinder of the twin-screw extruder is preferably from 40 to 100 mm from the perspective of preventing resin degradation during kneading and achieving better dispersion and distributivity.

In order to achieve good dispersion of polyethylene in the extrudate and to obtain excellent thickness uniformity for the fine porous membrane, a screw rotation speed (Ns) of the twin-screw extruder is preferably from 150 to 600 rpm. Furthermore, a ratio of extrudate amount Q (kg/h) of the polyolefin solution to Ns (rpm), Q/Ns, is preferably not greater than 0.6 kg/h/rpm. The ratio is more preferably not greater than 0.35 kg/h/rpm.

The polyolefin solution that is melt-kneaded in the extruder is extruded from the die directly or via yet another extruder, and an extrudate is obtained by forming the solution so that the thickness of the fine porous membrane of the final product is from 5 to 100 µm. A rectangular T-die may be used as a die. When a T-die is used, the slit gap of the die is preferably from 0.1 to 5 mm from the perspective of facilitating the control of the thickness of the fine porous membrane of the final product, and it is preferable to heat the composition to 140 to 250° C. at the time of extrusion.

Step (b-2) Formation of Gel-Like Sheet

A gel-like sheet is obtained by cooling the resulting extrudate, and cooling makes it possible to fix the microphase of the polyethylene that is separated by the solvent. In the cooling step, it is preferable to cool the gel-like sheet to a temperature not higher than the crystallization completion temperature. Cooling is preferably performed at a rate of not less than 250° C./min and more preferably at a rate of not less than 300° C./min until a temperature not higher than the crystallization completion temperature is reached on both the front and back of the gel-like sheet. If the cooling rate is within the range described above, the crystals forming the gel are not coarsened, and it becomes possible to achieve a minute high-order structure, which makes it difficult for the roughness of the surface to become uneven. In addition, because of the fineness of the high-order structure, the molecular orientation progresses easily at the time of subsequent stretching, which makes it possible to achieve both pin puncture strength and air permeation resistance and to control the coefficient of friction. Here, the crystallization completion temperature is the extrapolated crystallization completion temperature measured in accordance with JIS K7121 (1987). Specifically, a polyethylene has an extrapolated crystallization completion temperature of from approximately 70 to 90° C. The cooling rate described here can be determined by the time required for the resin temperature at the outlet of the extruder to reach the crystallization completion temperature and the temperature difference between the resin temperature at the outlet of the extruder and the crystallization completion temperature. Therefore, if cooling to a temperature not higher than the crystallization completion temperature in the cooling step, the difference between the resin temperature at the outlet of the extruder and the gel-like sheet temperature on each of the front and back at the end of the cooling step is divided by the time required to complete the cooling step. By controlling the cooling rate on one side (front side) of the gel-like sheet and the cooling rate on the other side (back side), it is possible to obtain a microporous membrane having a coefficient of static friction of from 0.5 to 1.0 when the front and back of the membrane are superimposed.

Examples of cooling methods for the extrudate include a method of bringing the extrudate into direct contact with cold air, cold water, or another cooling medium, a method of bringing the extrudate into contact with a roll that has been cooled with a cooling medium, and a method using a casting drum or the like. The solution that is extruded from the die is collected at a prescribed collection ratio before or during cooling. The lower limit of the collection ratio is preferably not less than 1. The upper limit is preferably not greater than 10 and more preferably not greater than 5. When the collection ratio is not greater than 10, neck-in formation becomes small, which makes breakage unlikely to occur at the time of stretching.

The lower limit of the thickness of the gel-like sheet is preferably 0.5 mm and more preferably 0.7 mm. The upper limit is 3 mm and more preferably 2 mm. If the thickness of the gel-like sheet is not greater than 3 mm, structural irregularities are not likely to form in the thickness direction during the cooling process. This makes it possible to make the high-order structure denser over the entire thickness direction and makes it possible to make both the structures on the front and back denser. In addition, when the thickness of the gel-like sheet is not greater than 3 mm, it is easy to set the cooling rate of the gel-like sheet to within the preferable range described above.

A case in which the fine porous membrane comprises a single layer was described above, but the polyolefin fine porous membrane of the present invention is not limited to a single layer and may also be a laminate formed by laminating several fine porous membranes (layers). The additionally laminated layers may each contain desired resins to a degree that does not diminish the effect of the present invention in addition to the polyethylene, as described above. A conventional method may be used as the method for forming the polyolefin fine porous membrane into a laminate. For example, there is a method of forming a laminate by preparing desired resins as necessary, supplying the resins to an extruder separately and melting the resins at a desired temperature, making the resins merge in a polymer tube or a die, and extruding the mixture from a slit-shaped die at each target laminate thickness.

Steps (c) and (d) Stretching

After the gel-like sheet obtained in the present invention is sequentially stretched by stretching in the longitudinal direction (machine direction) (step (c)) and then consecutively stretching in the transverse direction (direction orthogonal to the machine direction) (step (d)). By individually and consecutively performing stretching in the longitudinal direction and stretching in the transverse direction in this fashion, it becomes easy to achieve both pin puncture strength and air permeation resistance and to further achieve the prescribed coefficient of friction. Stretching is performed at a prescribed magnification by means of an ordinary tenter method, a roll method, or a combination thereof after the gel-like sheet is heated.

In the stretching method of the present invention, longitudinal stretching and transverse stretching are performed separately, so molecular orientation tends to progress easily due to the stretching tension being applied only in each direction in each stretching step. Therefore, the molecular orientation can be enhanced in comparison to simultaneous stretching, even at the same area magnification, which makes it possible to achieve a high pin puncture strength.

The stretching magnification differs depending on the thickness of the gel-like sheet, but the sheet is preferably stretched by not less than 5 times in each direction. Stretching in the longitudinal direction is preferably performed by not less than 5 times and more preferably not less than 7 times. The upper limit of longitudinal stretching is preferably 12 times and more preferably 10 times. If the stretching in the longitudinal direction is not less than 5 times, it is possible to impart high strength due to the tensilization. If the stretching in the longitudinal direction is not greater than 12 times, breakage due to stretching is unlikely to occur. Therefore, the stretching ratio for longitudinal stretching is preferably from 5 to 12 times and more preferably from 7 to 10 times.

Stretching in the transverse direction (width direction) is preferably performed by not less than 4 times and more preferably not less than 6 times. The upper limit of the ratio of transverse stretching is preferably 10 times and more preferably 8 times. When the stretching ratio in the transverse direction is not less than 4 times, it is possible to impart higher strength due to the tensilization. In addition, when the stretching ratio in the transverse direction is not greater than 10 times, breakage due to stretching is unlikely to occur, and it is possible to prevent the surface from becoming smooth due to the collapse of concavities and convexities on the membrane surface as a result of stretching. Therefore, the stretching ratio for transverse stretching is preferably from 4 to 10 times and more preferably from 6 to 8 times.

The area magnification combining longitudinal stretching and transverse stretching is preferably not less than 25 times, more preferably not less than 30 times, and most preferably not less than 42 times. The upper limit is not particularly limited but is preferably not more than 120 times from the perspective of preventing membrane puncture. The area magnification is preferably from 25 to 120 times, more preferably from 30 to 120 times, and even more preferably from 42 to 120 times.

The stretching temperature is preferably not higher than the melting point of the polyolefin resin and is more preferably in a range of from the crystalline dispersion temperature Tcd of the polyolefin resin to the melting point of the polyolefin resin. If the stretching temperature is not higher than the melting point of the gel-like sheet, the melting of the polyolefin resin is prevented, which makes it possible to efficiently align the molecular chains by stretching. In addition, if the stretching temperature is not higher than the crystalline dispersion temperature of the polyolefin resin, the softening of the polyolefin resin is sufficient, and the stretching tension is low. Therefore, the membrane forming characteristics are favorable, and stretching can be performed at a high ratio with a low likelihood of membrane puncture during stretching. Note that the stretching temperature in step (c) and the stretching temperature in step (d) may be the same as or different from one another.

Specifically, because the polyethylene resin has a crystalline dispersion temperature of about 80 to 100° C., the stretching temperature is preferably not less than 80° C. The upper limit of the stretching temperature is preferably 130° C., more preferably 125° C., and most preferably 120° C. Therefore, the stretching temperature when a polyethylene resin is used is preferably from 80 to 130° C., more preferably from 80 to 125° C., and even more preferably from 80 to 125° C. The crystalline dispersion temperature Tcd can be determined from the temperature characteristics of the dynamic visco-elasticity measured in accordance with ASTM D 4065. Also it can be obtained by NMR.

The stretching described above can create cleavages in the higher order structure formed in the gel sheet, leading to refinement of crystalline phase and formation of a multiplicity of fibrils. The fibrils form a mesh structure with three-dimensional irregular linkages. The stretching improves the mechanical strength and expands the fine pores, which is suitable for a battery separator.

In the present invention, it is important that sequential stretching is performed before the plasticizer in the gel-like sheet is removed. If the plasticizer is sufficiently contained in the gel-like sheet, the polyolefin is sufficiently plasticized so as to assume a softened state. Therefore, the cleavage of the high-order structure proceeds easily during stretching prior to the removal of the plasticizer, thus uniform refinement of the crystal phase can be achieved.

Step (e) Extraction (Washing) of Plasticizer from Stretched Membrane

Next, the solvent remaining in the gel-like sheet is extracted/removed—that is, washed—using a washing solvent. Since the polyolefin phase and the solvent phase are separated, a fine porous membrane is obtained as a result of the removal of the solvent. Examples of washing solvents include readily volatile solvents such as saturated hydrocarbons such as pentane, hexane, and heptane, chlorinated hydrocarbons such as methylene chloride and carbon tetrachloride, ethers such as diethylether and dioxane, ketones such as methyl ethyl ketone, chained fluorocarbons such as ethane trifluoride, $C_6F_{14}$, and $C_7F_{16}$, cyclic hydrofluorocarbons such as $C_5H_3F_7$, hydrofluoroethers such as $C_4F_9OCH_3$, and $C_4F_9OC_2H_5$, and perfluoroethers such as $C_4F_9OCF_3$, and $C_4F_9OC_2F_5$. These washing solvents have a low surface tension (for example, not greater than 24 mN/m at 25° C.). The use of a washing solvent having a low surface tension can suppress the shrinkage of the mesh-like structure forming fine pores due to the surface tension of the air/liquid interface during drying after washing and a fine porous membrane having high porosity and permeability is thereby obtained. These washing solvents are appropriately selected according to the solvent used to dissolve polyolefin resin and can be used alone or as a mixture.

The washing method may be a method of immersing the gel-like sheet in a washing solvent and then extracting the sheet, a method of showering the gel-like sheet with a washing solvent, or a method comprising a combination thereof. The amount of washing solvent that is used differs depending on the washing method but is typically preferably not less than 300 parts by weight per 100 parts by weight of the gel-like sheet. The washing temperature may be from 15 to 30° C. and is increased as necessary to at most 80° C. At this time, the amount of time that the gel-like sheet is immersed in the washing solvent is preferably longer from the perspective of enhancing the washing effect of the solvent, from the perspective of ensuring that the physical properties in the transverse direction and/or the longitudinal direction of the resulting fine porous membrane are not non-uniform, and from the perspective of enhancing the mechanical characteristics and electrical characteristics of the fine porous membrane.

Washing such as that described above is preferably performed until the residual solvent in the gel-like sheet—that is, the fine porous membrane—after washing is less than 1 wt. %.

Step (f) Drying the Microporous Membrane

After washing, the microporous membrane is dried and the washing solvent is removed. The method of drying is not particularly limited, but the solvent may be dried by heat drying, air drying, for example. The drying temperature is preferably not higher than the crystalline dispersion temperature Tcd of the polyethylene composition and is particularly preferably not lower than (Tcd−5° C.). Drying is preferably performed until the residual washing solvent is not greater than 5 wt. % and more preferably not greater than 3 wt. % on the basis of 100 wt. % of the dry weight of the fine porous membrane. If drying is insufficient, the porosity of the fine porous membrane may decrease in subsequent heat treatment, and the permeability may be diminished.

Other Steps

Stretching may also be performed further in the longitudinal direction, the transverse direction, or both directions by approximately 5% to 80% after washing and drying in order to enhance the membrane strength such as the pin puncture strength.

On the other hand, in the present invention, the stretched membrane or fine porous membrane after stretching may be subjected to heat setting treatment and/or heat relaxation treatment. The crystals are stabilized by heat setting treatment and heat relaxation treatment, which makes it possible to produce a fine porous membrane having a homogenized lamellar layer, a large pore size, and excellent strength. Heat setting treatment is performed at a temperature in the range of from the crystal dispersion temperature to the melting point of the polyolefin resin constituting the polyolefin fine porous membrane. Heat setting treatment is performed with a tenter method, a roll method, or a rolling method.

For example, a method disclosed in Japanese Unexamined Patent Application Publication No. 2002-256099A can be used as the heat relaxation treatment method.

Furthermore, hydrophilization treatment may also be applied to the stretched membrane or the fine porous membrane in accordance with the application. Hydrophilization treatment can be performed by monomer graft, surfactant treatment, corona discharge and the like. Monomer graft is preferably performed after the crosslinking treatment.

In the case of surfactant treatment, a nonionic surfactant, a cationic surfactant, an anionic surfactant, and an amphoteric surfactant may be used, but a nonionic surfactant is preferable. The fine porous membrane may be immersed in a solution prepared by dissolving a surfactant in water or a lower alcohol such as methanol, ethanol, or isopropyl alcohol. Alternatively, the solution may be applied to the fine porous membrane with a doctor blade method.

Corona discharge treatment may also be performed on at least one surface of the stretched membrane or the fine porous membrane as necessary in air, nitrogen, or a mixed atmosphere of carbon dioxide gas and nitrogen.

The present invention also provides a separator for a non-aqueous electrolyte secondary battery produced using the polyolefin microporous membrane described above, and a non-aqueous electrolyte secondary battery produced using such a separator for a non-aqueous electrolyte secondary battery. As described above, the polyolefin microporous membrane of the present invention has excellent temperature characteristics and shrinkage characteristics and also has an excellent balance of strength and permeability. Therefore, using such a microporous membrane makes it possible to obtain a separator for a non-aqueous electrolyte secondary battery having excellent strength and permeability and superior safety. And it is possible to obtain a non-aqueous electrolyte secondary battery having higher performance and better safety than conventional batteries.

Examples

Specific examples of the present invention will be described hereinafter using examples, but the present invention is not limited to these examples.

Measurement Methods 1. Polyolefin Molecular Weight Distribution Measurement

Molecular weight distribution measurements (measurements of the weight average molecular weight, the molecular weight distribution, the content of prescribed components, and the like) of the polyolefins were performed by high-temperature GPC. The measurement conditions were as follows.

Instrument: high-temperature GPC apparatus (Product No. HT-GPC, manufactured by Polymer Laboratories, PL-220)

Detector: differential refractometer RI
Guard column: Shodex G-HT
Columns: Shodex HT806M (two columns)
($\varphi$: 7.8 mm×30 cm, manufactured by Showa Denko Co., Ltd.)
Solvent: 1,2,4-trichlorobenzene (TCB, manufactured by Wako Pure Chemical Industries Co., Ltd.) (containing 0.1% BHT)
Flow rate: 1.0 mL/min
Column temperature: 145° C.
Sample preparation: First, 5 mL of a measurement solvent was added to 5 mg of a sample, and after the mixture was stirred while heating for 30 minutes at 160 to 170° C., the resulting solution was filtered with a metal filter (pore size: 0.5 μm).
Injection volume: 0.200 mL
Standard sample: monodisperse polystyrene (manufactured by Toso Co., Ltd.)
Data processing: GPC data processing system by TRC 2. Membrane Thickness The thickness of the microporous membrane was measured at a randomly selected MD position using a contact thickness meter. At this MD position, the membrane thickness was measured at intervals of 5 mm over a distance of 30 cm at points along the TD (width direction) of the membrane. Measurements along the TD were performed five times, and the arithmetic mean was used as the thickness of the sample.

3. Air Permeation Resistance

The air permeation resistance $P_1$ was measured for a microporous membrane having a membrane thickness $T_1$ using an air permeability meter (EGO-1T manufactured by Asahi Seiko Co., Ltd.), and the air permeation resistance $P_2$ at a membrane thickness of 16 μm was calculated from the formula $P_2=(P_1 \times 16)/T_1$.

4. Pin Puncture Strength

A needle 1 mm in diameter having a spherical surface (radius of curvature R: 0.5 mm) at the tip was used to puncture a microporous membrane having an average membrane thickness $T_1$ (μm) at a rate of 2 mm/sec, and the maximum load $L_1$ (load immediately prior to penetration, units: gf) was measured. The pin puncture strength $L_2$ (gf) at a membrane thickness of 16 μm was calculated from the formula $L_2=(L_1 \times 16)/T_1$.

5. Porosity

The porosity was calculated from the following formula using the mass $w_1$ of the microporous membrane and the mass $w_2$ of a membrane of the same size with no pores made of the same polyolefin composition as the microporous membrane: porosity (%)=$(w_2-w_1)/w_2 \times 100$.

6. Shrinkage Temperature and Shrinkage Rate in the TD

A test piece 10 mm long (TD) and 3 mm wide (MD), which was under a constant load (2 gf) in the TD, was heated from room temperature at a rate of 5° C./min using a thermomechanical analyzer (TMA/SS6600 manufactured by Seiko Electronic Industries Co., Ltd.), and the temperature at the inflection point of the sample length measured at around the melting point was recorded as the shutdown shrinkage temperature in the TD. In addition, the shrinkage rate of the length in the TD at the shutdown shrinkage temperature was calculated using the length at room temperature as a reference, and the obtained value was recorded as the shutdown shrinkage rate. Similarly, the temperature at which the sample length was smallest was recorded as the maximum shrinkage temperature in the TD, and the shrinkage rate of the length in the TD at the maximum shrinkage temperature (calculated using the value at room temperature as a reference) was recorded as the maximum shrinkage rate in the TD (see FIG. 1). That is, the shrinkage rate of the length in the TD at the shutdown shrinkage temperature (shrinkage rate A) and the shrinkage rate of the length in the TD at the maximum shrinkage temperature (shrinkage rate B) are determined using the following formulas, where the length in the TD at the shutdown shrinkage temperature is defined as "dimension A", the length in the TD at the maximum shrinkage temperature is defined as "dimension B", and the length in the TD at room temperature is defined as "dimension C".

Shrinkage rate $A=\{(\text{dimension } C)-(\text{dimension } A)\} \div (\text{dimension } C) \times 100$ Shrinkage rate $B=\{(\text{dimension } C)-(\text{dimension } B)\} \div (\text{dimension } C) \times 100$

7. Battery Impact Tests

A cylindrical battery was produced in accordance with the following procedure, and impact tests were performed.

Production of Cathode

A slurry was prepared by dispersing 92.2 mass % of a lithium cobalt composite oxide $LiCoO_2$ as an active substance, 2.3 mass % each of scaly graphite and acetylene black as conductive agents, and 3.2 mass % of polyvinylidene fluoride (PVDF) as a binder in N-methylpyrrolidone (NMP). This slurry was applied to one side of a piece of aluminum foil with a thickness of 20 μm to serve as a cathode current collector with a die coater at an active material coating volume of 250 g/m² and an active material bulk density of 3.00 g/cm³. This was then dried for three minutes at 130° C., and after the sample was pressure-molded with a roll pressing machine, the sample was cut to a width of approximately 57 mm to form a strip shape.

Production of Anode

A slurry was prepared by dispersing 96.9 mass % of artificial graphite as an active substance, 1.4 mass % of an ammonium salt of carboxymethylcellulose as a binder, and 1.7 mass % of a styrene-butadiene copolymer latex in purified water. This slurry was applied to one side of a piece of copper foil with a thickness of 12 μm to serve as an anode current collector using a die coater at a high filling density with an active material coating volume of 106 g/m² and an active material bulk density of 1.55 g/cm³. This was then dried for three minutes at 120° C., and after the sample was pressure-molded with a roll pressing machine, the sample was cut to a width of approximately 58 mm to form a strip shape.

Preparation of Non-Aqueous Electrolytic Solution

A non-aqueous electrolytic solution was prepared by dissolving $LiPF_6$ as a solute in a mixed solvent of ethylene carbonate/ethyl methyl carbonate (volume ratio of ½) so that the concentration was 1.0 mol/L.

Separator

The separators described in the examples and the comparative examples were slit into 60 mm strips.

Battery Assembly

A strip-shaped anode, a separator, a strip-shaped cathode, and another separator were superimposed in this order and then wound a plurality of times into a coil shape with a winding tension of 250 gf to produce an electrode plate laminate. This electrode plate laminate was housed in a stainless steel container with an outside diameter of 18 mm and a height of 65 mm. An aluminum tab derived from the positive current collector was welded to the terminal part of the container lid, and a nickel tab derived from the anode current collector was welded to the container wall. Drying was then performed in a vacuum for 12 hours at 80° C., and the non-aqueous electrolytic solution described above was injected into the container in an argon box and sealed.

Pretreatment

After the assembled battery was charged at a constant current with a current value of ⅓ C up to a voltage of 4.2 V, the battery was charged for five hours at a constant voltage of 4.2 V and then discharged at a current of ⅓ C until a final voltage of 3.0 V was reached. Next, after the battery was charged at a constant current with a current value of 1 C up to a voltage of 4.2 V, the battery was charged for two hours at a constant voltage of 4.2 and then discharged at a current of 1 C until a final voltage of 3.0 V was reached. Finally, after the battery was charged at a constant current with a current value of 1 C up to 4.2 V, the battery was charged for two hours at a constant voltage of 4.2 V as a form of pretreatment.

Impact Tests

After 20 batteries were produced using the method described above, impact tests were performed on each battery, and the impact resistance (safety) was evaluated based on the number of shorted batteries. First, each created battery was heated for 1 hour at 105° C., and after the battery was allowed to free-fall from a height of 2 m, the battery was left for 10 minutes. The terminal voltage was then measured, and cases in which the terminal voltage was less than 90% of the terminal voltage prior to the test were assessed as being in the "shorted state". The measurement results were then tabulated, and a smaller number of shorted batteries was evaluated as an indication of better impact resistance. The evaluation criteria are as follows.

Cases in which the number of shorted batteries was from 0 to 4 out of 20 batteries: E (excellent)

Cases in which from 5 to 10 out of 20 batteries shorted: G (good)

Cases in which from 11 to 14 out of 20 batteries shorted: F (fair)

Cases in which 15 or more out of 20 batteries shorted: X (poor)

Example 1

A polyethylene composition consisting of 15 wt. % of an ultrahigh molecular weight (UHMWPE, weight average molecular weight: $2.89 \times 10^6$, molecular weight distribution (Mw/Mn): 5.28) as an ultrahigh molecular weight polyethylene and 85 wt. % of a high-density polyethylene (HDPE, weight average molecular weight: $5.72 \times 10^5$, molecular weight distribution: 4.81) was prepared. When the entire amount of this polyethylene composition was defined as 100 wt. %, the content of polyethylene components having a molecular weight of not greater than 500000 was 62 wt. %, and the content of polyethylene components having a molecular weight of not less than 1000000 was 24 wt. %. A mixture was obtained by dry-blending 0.375 parts by mass of tetrakis[methylene-3-(3,5-ditertiary-butyl-4-hydroxyphenyl)-propionate]methane into 100 parts by mass of the obtained polyethylene composition.

A polyethylene solution was prepared by charging 30 parts by mass of the obtained mixture into a strong kneading type twin-screw extruder (charged amount of polyethylene composition Q: 54 kg/h), supplying 70 parts by mass of liquid paraffin from a side feeder of the twin-screw extruder, and melt-kneading at a temperature of 210° C. while maintaining the screw rotation speed Ns at 180 rpm (Q/Ns: 0.3 kg/h/rpm).

The obtained polyethylene solution was supplied from the twin-screw extruder to a T-die and was extruded so as to form a sheet-like extrudate. The extrudate was cooled while being drawn with a cooling roll adjusted to a temperature of 35° C. so as to form a gel-like sheet. Here, defining the cooling roll contact surface as "front" and the non-contact surface as "back", the cooling rate of the front surface was 399° C./min and the cooling rate of the back surface was 380° C./min. Longitudinal stretching (MD stretching) was performed on the obtained gel-like sheet with a roll method so that the sheet was stretched to a stretching ratio of 5 times at a stretching temperature of 115° C., and the sheet was then guided to a tenter and subjected to transverse stretching (TD stretching) at a stretching ratio of 6 times and a stretching temperature of 115° C. The stretched membrane was fixed to a 20 cm×20 cm aluminum frame plate and immersed in a methylene chloride washing bath. After the membrane was washed while oscillating for 10 minutes to remove liquid paraffin, the washed membrane was air-dried at room temperature. The membrane was then fixed for 10 minutes at 125° C. to produce a polyolefin microporous membrane having a thickness of 16 μm.

Example 2

A polyolefin microporous membrane was produced in the same manner as in Example 1 with the exception that the composition ratio of the polyethylene composition was adjusted so that the UHMWPE content was 30 wt. % and the HDPE content was 70 wt. %, and that the resin concentration of the polyethylene solution was changed so that the mixture content was 28.5 parts by mass and the liquid paraffin content was 71.5 parts by mass. When the molecular weight distribution of the polyethylene composition was measured, the content of polyethylene components having a molecular weight of not greater than 500000 was 59 wt. %, and the content of polyethylene components having a molecular weight of not less than 1000000 was 26 wt. %.

Example 3

A polyolefin microporous membrane was produced in the same manner as in Example 2 with the exception that the stretching temperature for MD stretching was set to 85° C.

Example 4

A polyolefin microporous membrane was produced in the same manner as in Example 1 with the exception that the composition ratio of the polyethylene composition was adjusted so that the UHMWPE content was 40 wt. % and the HDPE content was 60 wt. %, and that the resin concentration of the polyethylene solution was changed so that the mixture content was 25 parts by mass and the liquid paraffin content was 75 parts by mass. When the molecular weight distribution of the polyethylene composition was measured, the content of polyethylene components having a molecular weight of not greater than 500000 was 51 wt. %, and the content of polyethylene components having a molecular weight of not less than 1000000 was 35 wt. %.

Example 5

A polyolefin microporous membrane was produced in the same manner as in Example 4 with the exception that the stretching ratio for MD stretching was set to 7 times.

Example 6

A polyolefin microporous membrane was produced in the same manner as in Example 4 with the exception that the stretching ratio for MD stretching was set to 9 times.

Example 7

A polyolefin microporous membrane was produced in the same manner as in Example 4 with the exception that the stretching ratio for MD stretching was set to 7 times and that the stretching ratio for TD stretching was set to 5 times.

Example 8

A polyolefin microporous membrane was produced in the same manner as in Example 4 with the exception that the stretching ratio for MD stretching was set to 7 times and that the stretching ratio for TD stretching was set to 7 times.

Example 9

A polyolefin microporous membrane was prepared in the same manner as in Example 8 with the exception that an ultrahigh molecular weight polyethylene having a weight average molecular weight of $1.6 \times 10^6$ and a molecular weight distribution (Mw/Mn) of 5.3 was used as an ultrahigh molecular weight polyolefin. When the molecular weight distribution of the polyethylene composition was measured, the content of polyethylene components having a molecular weight of not greater than 500000 was 56 wt. %, and the content of polyethylene components having a molecular weight of not less than 1000000 was 29 wt. %.

Example 10

A polyolefin microporous membrane was produced in the same manner as in Example 9 with the exception that the resin concentration of the polyethylene solution was changed so that the mixture content was 28.5 parts by mass and the liquid paraffin content was 71.5 parts by mass.

Example 11

A polyolefin microporous membrane was produced in the same manner as in Example 2 with the exception that some of the conditions such as the stretching ratio or the stretching temperature were changed. Specifically, the conditions after the stretching step were changed as follows.

After the extrudate that was extruded from the T-die was cooled in the same manner as in Example 2 while being pulled with a cooling roll to form a gel-like sheet, longitudinal stretching (MD stretching) was performed on the obtained gel-like sheet with a roll method so that the sheet was stretched to a stretching ratio of 8 times at a stretching temperature of 115° C., and the sheet was then guided to a tenter and subjected to transverse stretching (TD stretching) at a stretching ratio of 8 times and a stretching temperature of 112° C.

The stretched membrane was washed in a washing tank of methylene chloride adjusted to a temperature of 25° C., and the liquid paraffin was removed. After the washed membrane was dried in a drying furnace adjusted to 60° C. and stretched by 1.4 times in the TD in a tenter at 131° C., the membrane was finally relaxed to a ratio of 1.3 times and then subjected to heat setting treatment for 40 seconds to obtain a polyolefin fine porous membrane having a thickness of 12 μm.

Comparative Example 1

A polyolefin microporous membrane was produced in the same manner as in Example 2 with the exception that, when the gel-like sheet was stretched, simultaneous biaxial stretching was performed at a stretching temperature of 115° C., a stretching ratio of 5 times in the MD, and a stretching ratio of 7 times in the TD instead of sequential stretching.

Comparative Example 2

A polyolefin microporous membrane was produced in the same manner as in Comparative Example 1 with the exception that the stretching ratio for TD stretching was set to 6 times.

Comparative Example 3

A polyolefin microporous membrane was produced in the same manner as in Example 8 with the exception that the composition ratio of the polyethylene composition was adjusted so that the UHMWPE content was 10 wt. % and the HDPE content was 90 wt. %, and that the resin concentration of the polyethylene solution was changed so that the mixture content was 30 parts by mass and the liquid paraffin content was 70 parts by mass. When the molecular weight distribution of the polyethylene composition was measured, the content of polyethylene components having a molecular weight of not greater than 500000 was 64 wt. %, and the content of polyethylene components having a molecular weight of not less than 1000000 was 21 wt. %.

Comparative Example 4

A polyolefin microporous membrane was produced in the same manner as in Example 6 with the exception that the composition ratio of the polyethylene composition was adjusted so that the HDPE content was 100 wt. %, and that the resin concentration of the polyethylene solution was changed so that the mixture content was 40 parts by mass and the liquid paraffin content was 60 parts by mass. When the molecular weight distribution of the polyethylene composition was measured, the content of polyethylene components having a molecular weight of not greater than 500000 was 68 wt. %, and the content of polyethylene components having a molecular weight of not less than 1000000 was 16 wt. %.

Comparative Example 5

An attempt was made to produce a polyolefin microporous membrane in the same manner as in Example 1 with the exception that the composition ratio of the polyethylene composition was adjusted so that the PE1 content was 60 wt. % and the PE2 content was 40 wt. %, but it was not possible to stably produce a membrane due to an increase in pressure during the process, and it was not possible to obtain a microporous membrane. When the molecular weight distribution of the polyethylene composition was measured, the content of polyethylene components having a molecular weight of not greater than 500000 was 43 wt. %, and the content of polyethylene components having a molecular weight of not less than 1000000 was 42 wt. %.

The results of the examples and comparative examples described above are shown in Tables 1 and 2.

TABLE 1

|  | Ultrahigh molecular weight polyethylene | | High-density poly-ethylene Amount Added [wt %] | Resin Concentration [wt %] | Content of components having a molecular weight of not less than 1000000 [%] | Content of components having a molecular weight of not more greater than 500000 [%] | MD ratio [times] |
|---|---|---|---|---|---|---|---|
|  | Weight average molecular weight [—] | Amount Added [wt %] | | | | | |
| Example 1 | $2.9 \times 10^6$ | 15 | 85 | 30 | 24 | 62 | 5 |
| Example 2 | $2.9 \times 10^6$ | 30 | 70 | 28.5 | 26 | 59 | 5 |
| Example 3 | $2.9 \times 10^6$ | 30 | 70 | 28.5 | 26 | 59 | 5 |
| Example 4 | $2.9 \times 10^6$ | 40 | 60 | 25 | 35 | 51 | 5 |
| Example 5 | $2.9 \times 10^6$ | 40 | 60 | 25 | 35 | 51 | 7 |
| Example 6 | $2.9 \times 10^6$ | 40 | 60 | 25 | 35 | 51 | 9 |
| Example 7 | $2.9 \times 10^6$ | 40 | 60 | 25 | 35 | 51 | 7 |
| Example 8 | $2.9 \times 10^6$ | 40 | 60 | 25 | 35 | 51 | 7 |
| Example 9 | $1.6 \times 10^6$ | 40 | 60 | 25 | 29 | 56 | 7 |
| Example 10 | $1.6 \times 10^6$ | 40 | 60 | 28.5 | 29 | 56 | 7 |
| Example 11 | $2.9 \times 10^6$ | 30 | 70 | 28.5 | 26 | 59 | 8 |
| Comparative Example 1 | $2.9 \times 10^6$ | 30 | 70 | 28.5 | 26 | 59 | 5 |
| Comparative Example 2 | $2.9 \times 10^6$ | 30 | 70 | 28.5 | 26 | 59 | 5 |
| Comparative Example 3 | $2.9 \times 10^6$ | 10 | 90 | 30 | 21 | 64 | 7 |
| Comparative Example 4 | — | — | 100 | 40 | 16 | 68 | 9 |
| Comparative Example 5 | $2.9 \times 10^6$ | 60 | 40 | 30 | 42 | 43 | Membrane production not possible |

TABLE 1-continued

|  | MD stretching temperature [° C.] | TD ratio [times] | TD stretching temperature [° C.] | Stretching method | Area magnification [times] | MD ratio/ TD ratio [-] |
|---|---|---|---|---|---|---|
| Example 1 | 115 | 6 | 115 | Sequential | 30 | 0.8 |
| Example 2 | 115 | 6 | 115 | Sequential | 30 | 0.8 |
| Example 3 | 85 | 6 | 115 | Sequential | 30 | 0.8 |
| Example 4 | 115 | 6 | 115 | Sequential | 30 | 0.8 |
| Example 5 | 115 | 6 | 115 | Sequential | 42 | 1.2 |
| Example 6 | 115 | 6 | 115 | Sequential | 54 | 1.5 |
| Example 7 | 115 | 5 | 115 | Sequential | 35 | 1.4 |
| Example 8 | 115 | 7 | 115 | Sequential | 49 | 1.0 |
| Example 9 | 115 | 7 | 115 | Sequential | 49 | 1.0 |
| Example 10 | 115 | 7 | 115 | Sequential | 49 | 1.0 |
| Example 11 | 115 | 8 | 112 | Sequential | 64 | 1.0 |
| Comparative Example 1 | 115 | 7 | 115 | Simultaneous | 35 | 0.7 |
| Comparative Example 2 | 115 | 6 | 115 | Simultaneous | 30 | 0.8 |
| Comparative Example 3 | 115 | 7 | 115 | Sequential | 49 | 1.0 |
| Comparative Example 4 | 115 | 6 | 115 | Sequential | 54 | 1.5 |
| Comparative Example 5 | Membrane production not possible | | | | | |

TABLE 2

|  | Porosity [%] | Air permeation resistance at 16 μm [sec/100 cc Air] | Pin puncture strength 16 μm [gf] | Pin puncture strength/air permeation resistance [(gf)/(sec/100 cc)] | Shutdown temperature in TD [° C.] | Maximum shrinkage temperature in TD [° C.] |
|---|---|---|---|---|---|---|
| Example 1 | 49 | 165 | 411 | 2.5 | 130.1 | 138.7 |
| Example 2 | 46 | 220 | 453 | 2.1 | 130.2 | 139.6 |
| Example 3 | 50 | 197 | 505 | 2.6 | 130.5 | 139.8 |
| Example 4 | 48 | 205 | 450 | 2.2 | 129.9 | 140.1 |
| Example 5 | 49 | 177 | 461 | 2.6 | 131.8 | 141.3 |
| Example 6 | 50 | 183 | 497 | 2.7 | 132.5 | 141.4 |
| Example 7 | 50 | 164 | 417 | 2.5 | 132.1 | 140.7 |
| Example 8 | 48 | 197 | 515 | 2.6 | 130.9 | 141.6 |
| Example 9 | 52 | 141 | 469 | 3.3 | 132.7 | 141.6 |
| Example 10 | 49 | 163 | 520 | 3.2 | 132.5 | 141.5 |
| Example 11 | 44 | 205 | 658 | 3.2 | 132.9 | 142.1 |
| Comparative Example 1 | 42 | 227 | 394 | 1.7 | 129.6 | 139.4 |
| Comparative Example 2 | 41 | 210 | 372 | 1.8 | 130.6 | 139.8 |
| Comparative Example 3 | 48 | 186 | 456 | 2.5 | 132.8 | 139.9 |
| Comparative Example 4 | 40 | 252 | 458 | 1.8 | 132.7 | 138.0 |
| Comparative Example 5 | Membrane production not possible | | | | | |

|  | Maximum shrinkage temperature − shutdown temperature in TD [° C.] | Shutdown shrinkage rate in TD [%] | Maximum shrinkage rate in TD [%] | Maximum shrinkage rate − shutdown shrinkage rate in TD [%] | Battery impact test results [-] |
|---|---|---|---|---|---|
| Example 1 | 8.6 | 16.1 | 37.9 | 21.8 | G |
| Example 2 | 9.3 | 16.3 | 39.0 | 22.7 | G |
| Example 3 | 9.3 | 16.6 | 32.5 | 15.9 | E |
| Example 4 | 10.2 | 16.4 | 39.9 | 23.4 | G |
| Example 5 | 9.5 | 16.6 | 34.9 | 18.3 | E |
| Example 6 | 8.9 | 16.8 | 29.3 | 12.5 | E |
| Example 7 | 8.6 | 15.1 | 28.9 | 13.8 | E |
| Example 8 | 10.7 | 18.1 | 40.6 | 22.5 | G |
| Example 9 | 8.9 | 17.9 | 39.6 | 21.7 | G |
| Example 10 | 9.0 | 17.7 | 38.7 | 21.0 | G |
| Example 11 | 9.2 | 12.0 | 33.7 | 21.7 | G |
| Comparative Example 1 | 9.8 | 12.2 | 37.5 | 25.3 | F |

TABLE 2-continued

|  |  |  |  |  |  |
|---|---|---|---|---|---|
| Comparative Example 2 | 9.1 | 11.8 | 36.8 | 25.0 | F |
| Comparative Example 3 | 7.1 | 17.7 | 38.0 | 20.3 | X |
| Comparative Example 4 | 5.3 | 12.8 | 32.6 | 19.8 | X |
| Comparative Example 5 | Membrane production not possible | | | | |

INDUSTRIAL APPLICABILITY

The polyolefin microporous membrane of the present invention is suitable for use in a separator for a non-aqueous electrolyte secondary battery.

The invention claimed is:

1. A polyolefin microporous membrane, comprising: a temperature difference not less than 7.2° C. between a shutdown shrinkage temperature and a maximum shrinkage temperature in a direction transverse to a machine direction (TD) as measured by a thermomechanical analyzer (TMA);
   a rate difference less than 25% between a shutdown shrinkage rate and a maximum shrinkage rate in the TD;
   a pin puncture strength at a membrane thickness of 16 μm being not less than 400 gf; and
   a ratio of pin puncture strength to air permeation resistance at a membrane thickness of 16 μm being from 2.0 to 4.0 (gf/(sec/100 cc)).

2. The polyolefin microporous membrane according to claim 1, having a porosity not less than 45%.

3. The polyolefin microporous membrane according to claim 1, wherein a content of a polyolefin having a molecular weight of not greater than $5.0 \times 10^5$ is not greater than 63 wt. %, and a content of a polyolefin having a molecular weight of not less than $1.0 \times 10^6$ is not less than 21 wt. %.

4. The polyolefin microporous membrane according to claim 1, wherein a content of an ultrahigh molecular weight polyolefin having a weight average molecular weight of not less than $1.0 \times 10^6$ is from 15 to 45 wt. %.

5. A separator for a non-aqueous electrolyte secondary battery comprising a polyolefin microporous membrane, wherein the polyolefin microporous membrane comprises:
   a temperature difference not less than 7.2° C. between a shutdown shrinkage temperature and a maximum shrinkage temperature in a direction transverse to a machine direction (TD) as measured by a thermomechanical analyzer (TMA);
   a rate difference less than 25% between a shutdown shrinkage rate and a maximum shrinkage rate in the TD;
   a pin puncture strength at a membrane thickness of 16 μm being not less than 400 gf; and
   a ratio of pin puncture strength to air permeation resistance at a membrane thickness of 16 μm being from 2.0 to 4.0 (gf/(sec/100 cc)).

6. The separator according to claim 5, wherein the polyolefin microporous membrane has a porosity not less than 45%.

7. The separator according to claim 5, wherein the polyolefin microporous membrane has a content of a polyolefin having a molecular weight of not greater than $5.0 \times 10^5$ not greater than 63 wt. %, and wherein the polyolefin microporous membrane has a content of a polyolefin having a molecular weight not less than $1.0 \times 10^6$ of not less than 21 wt. %.

8. The separator according to claim 5, wherein the polyolefin microporous membrane has a content of an ultrahigh molecular weight polyolefin having a weight average molecular weight not less than $1.0 \times 10^6$ from 15 to 45 wt. %.

9. A non-aqueous electrolyte rechargeable battery comprising the separator of claim 5.

\* \* \* \* \*